United States Patent [19]

Nagai et al.

[11] Patent Number: 4,584,242

[45] Date of Patent: Apr. 22, 1986

[54] PLATE-LIKE BARIUM FERRITE PARTICLES FOR MAGNETIC RECORDING AND PROCESS FOR PRODUCING THE SAME

[75] Inventors: Norimichi Nagai; Norio Sugita; Nanao Horiishi, all of Hiroshima; Masao Kiyama; Toshio Takada, both of Kyoto, all of Japan

[73] Assignee: Toda Kogyo Corp., Hiroshima, Japan

[21] Appl. No.: 738,471

[22] Filed: May 28, 1985

[30] Foreign Application Priority Data

May 31, 1984 [JP] Japan ................................ 59-112520
May 31, 1984 [JP] Japan ................................ 59-112521

[51] Int. Cl.$^4$ ............................................. C04B 35/26
[52] U.S. Cl. ................................ 428/403; 252/62.56; 252/62.59; 252/62.62; 252/62.63; 427/127; 427/128; 427/215; 428/694; 428/900
[58] Field of Search ................. 427/127, 128, 215; 428/403, 694, 900; 252/62.56, 62.59, 62.62, 62.63

[56] References Cited

U.S. PATENT DOCUMENTS

| | | | |
|---|---|---|---|
| 3,093,589 | 6/1963 | Downs et al. ..................... | 252/62.63 |
| 4,341,648 | 7/1982 | Kubo et al. ................... | 252/62.59 X |
| 4,425,250 | 1/1984 | Hibst ............................... | 252/62.59 |
| 4,529,524 | 7/1985 | Nagai et al. ..................... | 252/62.59 |

Primary Examiner—Jack Cooper
Attorney, Agent, or Firm—Cushman, Darby & Cushman

[57] ABSTRACT

Disclosed herein are plate-like barium ferrite particles for magnetic recording, comprising plate-like particles represented by the formula:

$$BaFe_{12-2x}M_xTi_xO_{19}$$

wherein x is 0 to 1.2 and M represents Co (II) or Co (II) and a divalent metal ion other than Co (II), the surface of the plate-like particles being modified with magnetite represented by the formula:

$$FeO_y \cdot Fe_2O_3$$

wherein y is over 0 and not more than 1, and a process for producing the same.

2 Claims, 2 Drawing Figures

PLATE-LIKE BARIUM FERRITE PARTICLES FOR MAGNETIC RECORDING AND PROCESS FOR PRODUCING THE SAME

BACKGROUND OF THE INVENTION

The present invention relates to plate-like barium ferrite particles for magnetic recording, comprising plate-like particles represented by the formula:

$$BaFe_{12-2x}M_xTi_xO_{19}$$

wherein x is a number of from 0 to 1.2 and M represents Co(II) or Co(II) and a divalent metal ion other than Co(II), the surface of the plate-like particles being modified with a magnetite represented by the formula:

$$FeO_y \cdot Fe_2O_3$$

wherein y is a number of over 0 and not more than 1, and a process for producing the plate-like barium ferrite particles.

In recent years, accompanying with the propagation of VTR, audio component, word processor and computer, ferromagnetic non-acicular particles of a favorable dispersibility provided with a suitable coercive force(Hc) and a large value of magnetization (M) are demanded as a magnetic material for recording, particularly as the magnetic material for perpendicular magnetic recording.

In general, as the ferromagnetic non-acicular particles, barium ferrite particles have been well known. However, the coercive force of the barium ferrite particles obtained by the dry process is ordinarily higher than 3000 Oe, and because of such a high coercive force, barium ferrite particles are not favorable as a magnetic material for magnetic recording, namely, as the magnetic material for use in magnetic recording, barium ferrite particles having a coercive force of from 300 to 1000 Oe are demanded.

As a method for reducing the coercive force of barium ferrite particles, for instance, a method has been already known wherein a part of Fe(III) in the barium ferrite is substituted with other metal ion (for instance, Co(II) and Ti(IV)), thereby reducing the coercive force wherein the change of saturation magnetization thereof is minimized as far as possible.

Further, since the conventional barium ferrite particles obtained by sintering are composed of polycrystals of an average diameter of a few micrometers and the average diameter of the particles is at least one micrometer even after pulverization thereof, such particles are poor in dispersibility in paints and are not favorable as the magnetic particles for magnetic recording. In short, as the magnetic particles for use in magnetic recording, those which are as fine as possible, particularly those of an average particle diameter of 0.05 to 0.3 μm have been demanded. This fact is shown in many published literatures, for instance, in Japanese Patent Application Laid-Open No. 53-20596 (1978) ". . . in the case where the average particle diameter is over 0.5 μm, there is a difficulty in uniformly dispersing such particles in paints. . . . . ", in Japanese Patent Application Laid-Open No. 56-125219 (1981) "In the range of recording wavelength of shorter than 1 μm, the perpendicular magnetic recording is more useful as compared with longitudinal magnetic recording, and in order to carry out the sufficient recording and regeneration in such a wavelength region, it is preferable that the particle diameter of the ferrite is less than about 0.3 μm. However, since the particles of about 0.01 μm in diameter do not exhibit the desired ferromagnetism, as an preferable diameter of particle, the range of 0.01 to 0.3 μm is demanded." and in Japanese Patent Application Laid-Open No. 57-212623 (1982) "it is suitable that the average diameter of magnetic barium ferrite particles is less than 0.3 μm, and particularly, those fine particles of 0.03 to 0.3 μm in average particle diameter are favorably suitable. Because, the particles of below 0.03 μm in average particle diameter do not exhibit the ferromagnetism sufficient for magnetic recording, and the particles of over 0.3 μm in average particle diameter can not advantageously carry out the magnetic recording as the high density recording."

Further, it is necessary that the magnetization of the magnetic particles is as large as possible, and the fact is disclosed, for instance, in Japanese Patent Application Laid-Open No. 56-149328 (1981). "It is required that the saturation magnetization of magnetoplumbite ferrite used as the material for medium of magnetic recording is as large as possible."

On the other hand, as one of the processes for producing barium ferrite, a process of thermally treating an aqueous alkaline suspension containing Ba-ions and Fe(III) in an autoclave as the reactor (the process is hereinafter simply referred to as "the autoclaving process") has been hitherto known. According to the autoclaving process, barium ferrite particles precipitate under the suitably selected reaction conditions. The thus precipitated particles are hexagonal plate-like particles, the distribution of the particle size and the average size of the particles differ according to the reaction conditions resulting in the difference of the magnetic properties of the particles.

The present inventors who have engaged in studies and development of the plate-like barium ferrite particles obtained by the autoclaving process has known that the plate-like barium ferrite particles of 0.05 to 0.3 μm in average particle diameter are available depending on the reaction conditions in the autoclaving process, however, in the case where the platelike barium ferrite particles of 0.05 to 0.3 μm in average diameter and of a large magnetization, particularly of 40 emu/g are produced, such an obtained particles show a coercive force of larger than 1000 Oe.

Namely, the present inventors have conducted various examinations for obtaining the plate-like ferrite particles suitable for magnetic recording, showing a coercive force of 300 to 1000 Oe and an average particle diameter of 0.05 to 0.3 μm. As a result of the examination, the present inventors have known that, by the autoclaving process, in the case where the plate-like barium ferrite particles of $BaFe_{12-2x}M_xTi_xO_{19}$ wherein x is 0 to 1.2 and M represents Co(II) or Co(II) and other divalent metal ion than Co(II) are formed in the presence of Ti(IV) and Co(II), or in the presence of Ti(IV), Co(II) and a divalent metal ion other than Co(II) such as Fe, Zn and Mn, it is possible to obtain the plate-like barium ferrite particles of a coercive force of 300 to 1000 Oe and an average particle diameter of 0.05 to 0.3 μm (refer to European Patent Application Laid-Open No. 0123445).

The coercive force (Hc) of the thus formed plate-like barium ferrite particles of $BaFe_{12-2x}M_xTi_xO_{19}$ by adding Co ions as M(II) lowers in the case where x becomes larger, and the coercive force thereof is 100 Oe when x is 1.2.

However, the magnetization (M) in the magnetic field of 10 KOe of the thus obtained barium ferrite particles was only less than 40 emu/g in the case wherein x was higher than 0.3.

By the way, in the case where a part of Co(II) as M(II) was substituted by Fe, Zn or Mn, the magnetic properties show some change depending on the kinds and/or the amount of the metal ion.

In consideration of the foregoings, as a result of variously examining the process for further raising the magnetization of the plate-like barium ferrite particles of $BaFe_{12-2x}M_xTi_xO_{19}$, wherein x is 0 to 1.2 and M represents Co(II) or Co(II) and other divalent metal ion than Co(II), showing a coercive force of 300 to 1000 Oe and 0.05 to 0.3 μm in average particle diameter, obtained by the autoclaving process, the present inventors have found that (1) in the case where the plate-like barium ferrite particles of $BaFe_{12-2x}M_xTi_xO_{19}$ wherein $0 \leq x \leq 1.2$ and M represents Co(II) or Co(II) and divalent metal ion other than Co(II), obtained by the autoclaving process, are mixed with an aqueous suspension of $Fe(OH)_2$ of pH 8.0 to 14.0 containing Fe(II) in an amount of not more than 50 atomic % to all Fe(III) and the resultant mixture is thermally treated at 50° to 100° C. in a non-oxidative atmosphere, whereby the surface of the particles is modified with a magnetite of $FeO_y \cdot Fe_2O_3$ wherein $0 < y \leq 1$, the magnetization of the thus modified particles can be raised, (2) the modifying rate of the magnetite depends on the concentration of excessive sodium hydroxide of the aqueous suspension and the temperature of thermal treatment, and (3) the magnetic properties and electric conductivity of the thus obtained particles by modifying the particles of a composition of $BaFe_{12-2x}M_xTi_xO_{19}$ wherein x and M are as defined above with magnetite of $FeO_y \cdot Fe_2O_3$ wherein y is as defined above depend on the composition thereof and the modifying rate of the magnetite, and based on the findings (1), (2) and (3), the present invention has been attained.

SUMMARY OF THE INVENTION

In a first aspect of the present invention, there is provided plate-like barium ferrite particles showing a magnetization (M) of more than 40 emu/g in a magnetic field of 10KOe, a coercive force of 300 to 1000 Oe and an average particle diameter of 0.05 to 0.3 μm, comprising plate-like particles represented by the formula:

$BaFe_{12-2x}M_xTi_xO_{19}$ wherein x is 0 to 1.2 and M represents Co(II) or Co(II) and a divalent metal ion other than Co(II), the surface of the platelike particles being modified with magnetite represented by the formula:

$FeO_y \cdot Fe_2O_3$ wherein y is over 0 and not more than 1.

In a second aspect of the present invention, there is provided a process for producing the plate-like particles for use in magnetic recording comprising mixing the plate-like particles represented by the formula: $BaFe_{12-2x}M_xTi_xO_{19}$ wherein x is 0 to 1.2 and M represents Co(II) or Co(II) and a divalent metal ion other than Co(II) with an aqueous alkaline (pH 8.0 to 14) suspension of $Fe(OH)_2$ containing not more than 50 atomic % of Fe(II) to total Fe(III) of said plate-like particles, and thermally treating the thus prepared aqueous mixture at a temperature of 50° to 100° C. in a non-oxidative atmosphere, whereby the surface of said plate-like particles of $BaFe_{12-2x}M_xTi_xO_{19}$, wherein x and M are as defined above, is modified with a magnetite of $FeO_y \cdot Fe_2O_3$ wherein y is over 0 and not more than 1.

BRIEF EXPLANATION OF DRAWING

Of the attached drawing.

DETAILED DESCRIPTION OF THE INVENTION

Figure 1:
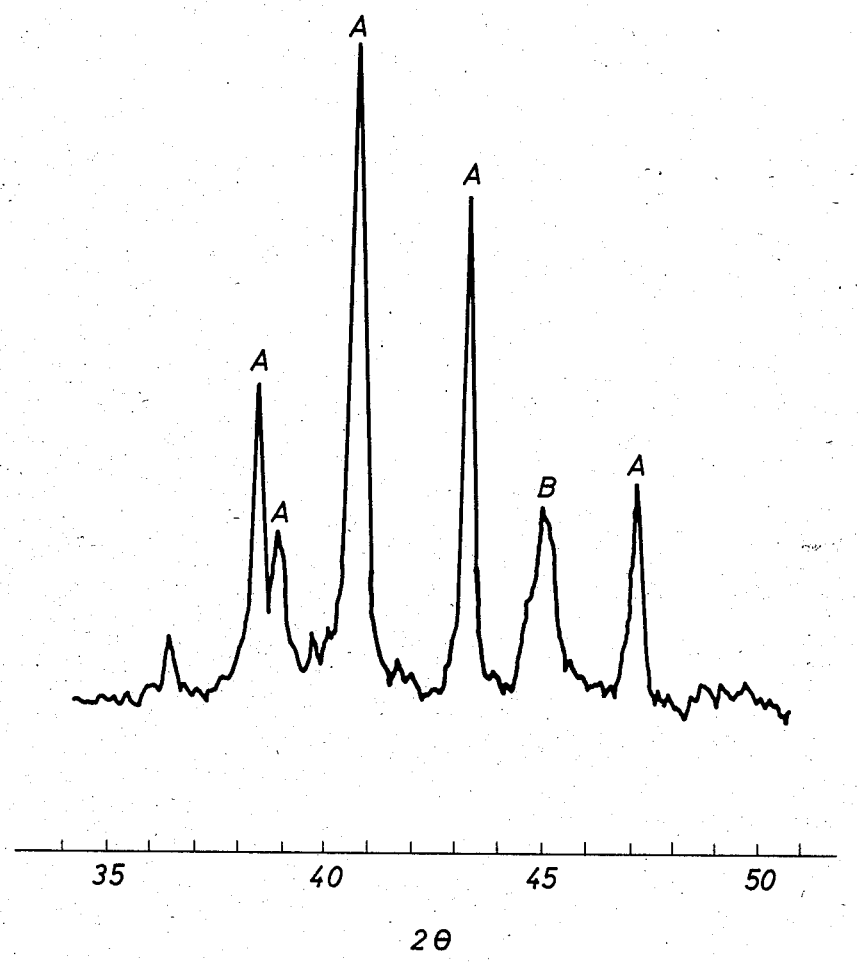
FIGS. 1 and 2 are the X-ray diffraction patterns, respectively of the blackish brown particles obtained in Examples 1 and 5, respectively, and the respective peaks marked with A and B in FIGS. 1 and 2 are those of barium ferrite and those of magnetite.

In the first, the process for preparing the plate-like particles of $BaFe_{12-2x}M_xTi_xO_{19}$ wherein x is 0 to 1.2 and M represents Co(II) or Co(II) and a metal ion other than Co(II), which are to be modified with the magnetite is briefly described as follows.

The plate-like barium ferrite particles represented by the formula: $BaFe_{12-2x}M_xTi_xO_{19}$ wherein $0 \leq = < 1.2$ and M represents Co(II) or Co(II) and a divalent metal other than Co(II) are prepared by autoclaving an aqueous alkaline suspension of ferric hydroxide containing Ti(IV), Ba(II) and at least Co(II) as M(II) and a molar excess of an alkali metal hydroxide with respect to the total amount of Fe(III), Ti(IV), M(II) and Ba(II) at a temperature of from 200° to 330° C.

More in detail, the aqueous alkaline suspension of ferric hydroxide containing Ti(IV), Ba(II) and, as M(II), Co(II) or Co(II) and the divalent metal ion other than Co(II) such as Zn(II) and Mn(II), preferably the atomic amount of M(II) is the same as that of Ti(IV) is autoclaved at a temperature of 200° to 330° C.

As the source of Fe(III) in the present invention, ferric chloride, ferric nitrate or powdery ferric oxyhydroxide may be used. As the source of Ba(II) in the present invention, barium hydroxide, barium nitrate or barium chloride may be used. As the source of Co(II) in the present invention, cobalt nitrate or cobalt chloride may be used. As the source of Ti(IV) in the present invention, titanium chloride or an alkali titanate may be used. As the source of Fe(II) in the present invention, ferrous chloride or ferrous sulfate may be used. As the source of Zn(II) in the present invention, zinc nitrate or zinc chloride may be used and as the source of Mn(II) in the present invention, manganese nitrate or manganese chloride may be used.

The autoclaving treatment in the present invention may be carried out at any temperature of lower than the critical temperature of the aqueous suspension, and particularly at a temperature of 200° to 330° C., preferably 240° to 330° C., is suitable for an economic production of the ferrite.

The thus obtained plate-like particles represented by the formula: $BaFe_{12-2x}M_xTi_xO_{19}$ wherein x and M are as defined above, show an average particle diameter of 0.05 to 0.3 μm, a magnetization less than 40 emu/g in a magnetic field of 10KOe.

In the second, the thus obtained plate-like barium ferrite particles are mixed with an aqueous alkaline suspension of $Fe(OH)_2$ of pH 8.0 to 14.0 containing Fe(II) in an amount of not more than 50 atomic %, preferably 5 to 30 atomic % to the total amount of Fe(III) in the particles and the resultant mixture is thermally treated at 50° to 100° C. in a non-oxidative atmosphere, whereby the surface of the particles is modified with a magnetite of $FeO_y \cdot Fe_2O_3$ wherein $0 < y \leq 1$.

In the case where the amount of $Fe(OH)_2$ is more than 50 atomic %, $Fe(OH)_2$ not contributing to the magnetite-modifying remains in the system, or exists in the system as the oxide thereof.

On the other hand, in the case of less than 0.1 atomic %, the magnetite-modifying of the particles is insufficient.

The pH of the aqueous alkaline suspension in the present invention is 8.0 to 14.0. In the case of lower than 8.0, the stable existence of $Fe(OH)_2$ is hardly obtained. On the other hand, in the strongly alkaline solution, $Fe(OH)_2$ exists in a stable state and the reaction of modifying the plate-like barium ferrite particles with $Fe(OH)_2$ is caused and accordingly, the region of pH of from 8.0 to 14.0 is favorable for the object of the present invention in view of the industrial effect of the process.

As has been stated, modifying of the plate-like barium ferrite particles is carried at a temperature of 50° to 100° C., and in the case of lower than 50° C., the reaction of modifying the plate-like barium ferrite particles with $Fe(OH)_2$ is hardly caused. On the other hand, in the case of higher than 100° C., although the reaction of modifying occurs, from the view point that the reaction is carried out in an aqueous solution, the object of the present invention is sufficiently achieved at a temperature between 50 and 100° C.

According to the present invention, the plate-like barium ferrite particles of $BaFe_{12-2x}M_xTi_xO_{19}$, wherein x and M are as defined above modified with magnetite of $FeO_y \cdot Fe_2O_3$ wherein y is as defined above showing a magnetization of larger than 40 emu/g in the magnetic field of 10 KOe, the coercive force of 300 to 1000 Oe, and an average particle diameter of 0.05 to 0.3 μm can be obtained and the thus obtained plate-like barium ferrite particles are favorably suitable as the magnetic material for magnetic recording, particularly as the magnetic material for perpendicular magnetic recording.

In addition, since the surface of the plate-like barium ferrite particles obtained according to the present invention are modified with the magnetite, the surface of the particle is been improved and the electric resistance of the particle has been lowered.

The present invention will be explained more in detail while referring to the non-limitative Examples and Comparative Examples as follows.

The average diameter of the particles in Examples and Comparative Examples is determined by electronmicrophotograph of the particles; a magnetization of the particles is determined in the magnetic field of 10 KOe and the coercive force of the particles is determined at a packing density of 1.6 g/cm³.

EXAMPLE 1

120 g of the plate-like particles of $BaFe_{12}O_{19}$, showing an average particle diameter of 0.2 to 0.3 μm, BET specific surface area of 31 m²/g, a magnetization (M) of 36 emu/g and a coercive force (Hc) of 1050 Oe were mixed with an aqueous alkaline suspension of 0.17 mol of $Fe(OH)_2$ (corresponding to 13.1 atomic % of Fe(II) to Fe(III) of the particles), and water was added to the thus obtained mixture to make the total volume of a mixture to 1.5 liters (pH 12.3).

The thus prepared aqueous mixture was heated to 90° C., and was stirred for one hour while preventing the adulteration of air thereinto as far as possible.

The thus formed blackish brown particles were collected by filtration, washed with water, and after treating with acetone, dried at room temperature.

As a result of electronmicroscopic observation, the shape and the size of the thus obtained particles were almost the same as those of the particles before the treatment.

The thus obtained blackish brown particles showed BET specific surface area of 28 m²/g, a coercive force (Hc) of 690 Oe and a magnetization (M) of 45 emu/g.

FIG. 1 is the X-ray diffraction pattern of the thus obtained blackish brown particles, the peaks (A) being those of barium ferrite and the peaks (B) being those of magnetite. Namely, the particle shows a double-phase structure.

EXAMPLE 2

120 g of the plate-like particles of $BaF_{12}O_{19}$, showing an average particle diameter of 0.15 to 0.25 μm, BET specific surface area of 31 m²/g, a magnetization (M) of 36 emu/g and a coercive force (Hc) of 1050 Oe were mixed with an aqueous suspension of 0.21 mol of $Fe(OH)_2$ (corresponding to 16.2 atomic % of Fe(II) to Fe(III) of the particles), and water was added to the thus obtained mixture to make the total volume of a mixture to 1.5 liters (pH 12.4).

The thus prepared aqueous mixture was heated to 90° C., and was stirred for one hour while preventing the adulteration of air thereinto as far as possible.

The thus formed blackish brown particles were collected by filtration, washed with water, and after treating with acetone, dried at room temperature. As a result of electronmicroscopic observation, the shape and the size of the thus obtained particles were almost the same as those of the particles before the treatment.

The thus obtained blackish brown particles showed BET specific surface area of 27 m²/g, a coercive force (Hc) of 520 Oe and a magnetization of 49 emu/g.

As a result of X-ray diffraction analysis of the thus obtained blackish brown particles, there are two kinds of peaks, one being a peak of barium ferrite and the other being a peak of magnetite and accordingly, it is recognized that the particle shows a double-phase structure.

EXAMPLE 3

120 g of the plate-like particles of a composition of $BaFe_{12}O_{19}$, showing an average particle diameter of 0.2 to 0.3 μm, BET specific surface area of 28 m²/g, a magnetization (M) of 39 emu/g and a coercive force (Hc) of 1120 Oe were mixed with an aqueous alkaline suspension of 0.31 mol of $Fe(OH)_2$ (corresponding to 23.9 atomic % of Fe(II) to Fe(III) of the particles), and water was added to the thus obtained mixture to make the total volume of a mixture to 1.5 liters (pH 12.5).

The thus prepared aqueous mixture was heated to 70° C., and was stirred for one hour while preventing the adulteration of air thereinto as far as possible.

The thus formed blackish brown particles were collected by filtration, washed with water, and after treating with acetone, dried at room temperature.

As a result of electronmicroscopic observation, the shape and the size of the thus obtained particles were almost the same as those of the particles before the treatment.

The thus obtained blackish brown particles showed BET specific surface area of 24 m²/g, a coercive force (Hc) of 620 Oe and a magnetization (M) of 52 emu/g.

As a result of X-ray diffraction analysis of the thus obtained blackish brown particles, there are two kinds of peaks, one being a peak of barium ferrite and the other being a peak of magnetite and accordingly, it is recognized that the particle shows a double-phase structure.

EXAMPLE 4

120 g of the plate-like particles of a composition of $BaFe_{11.36}Co_{0.32}Ti_{0.32}O_{19}$ showing an average particle diameter of 0.2 to 0.3 μm, BET specific surface area of 49 m²/g, a magnetization (M) of 31 emu/g and a coercive force (Hc) of 680 Oe were mixed with an aqueous alkaline suspension of 0.21 mol of Fe(OH)₂ (corresponding to 17.1 atomic % of Fe(II) to Fe(III) of the particles), and water was added to the thus obtained mixture to make the total volume of a mixture to 1.5 liters (pH 12.4).

The thus prepared aqueous mixture was heated to 90° C., and was stirred for one hour while preventing the adulteration of air thereinto as far as possible.

The thus formed blackish brown particles were collected by filtration, washed with water, and after treating with acetone, dried at room temperature.

As a result of electronmicroscopic observation, the shape and the size of the thus obtained particles were almost the same as those of the particles before the treatment.

The thus obtained blackish brown particles showed BET specific surface area of 41 m²/g, a coercive force (Hc) of 530 Oe and a magnetization (M) of 43 emu/g.

As a result of X-ray diffraction analysis of the thus obtained blackish brown particles, there are two kinds of peaks, one being a peak of barium ferrite and the other being a peak of magnetite, and accordingly, it is recognized that the particle shows a double-phase structure.

EXAMPLE 5

120 g of the plate-like particles of a composition of $BaFe_{10.8}Co_{0.6}Ti_{0.6}O_{19}$, showing an average particle diameter of 0.1 to 0.2 μm, BET specific surface area of 41 m²/g, a magnetization (M) of 33 emu/g and a coercive force (Hc) of 540 Oe were mixed with an aqueous alkaline suspension of 0.31 mol of Fe(OH)₂ (corresponding to 26.5 atomic % of Fe(II) to Fe(III) of the particles), and water was added to the thus obtained mixture to make the total volume of a mixture to 1.5 liters (pH 13.0).

The thus prepared aqueous mixture was heated to 90° C., and was stirred for one hour while preventing the adulteration of air thereinto as far as possible.

The thus formed blackish brown particles were collected by filtration, washed with water, and after treating with acetone, dried at room temperature.

As a result of electronmicroscopic observation, the shape and the size of the thus obtained particles were almost the same as those of the particles before the treatment.

The thus obtained blackish brown particles showed BET specific surface area of 35 m²/g, coercive force (Hc) of 430 Oe and a magnetization (M) of 51 emu/g.

Figure 2:
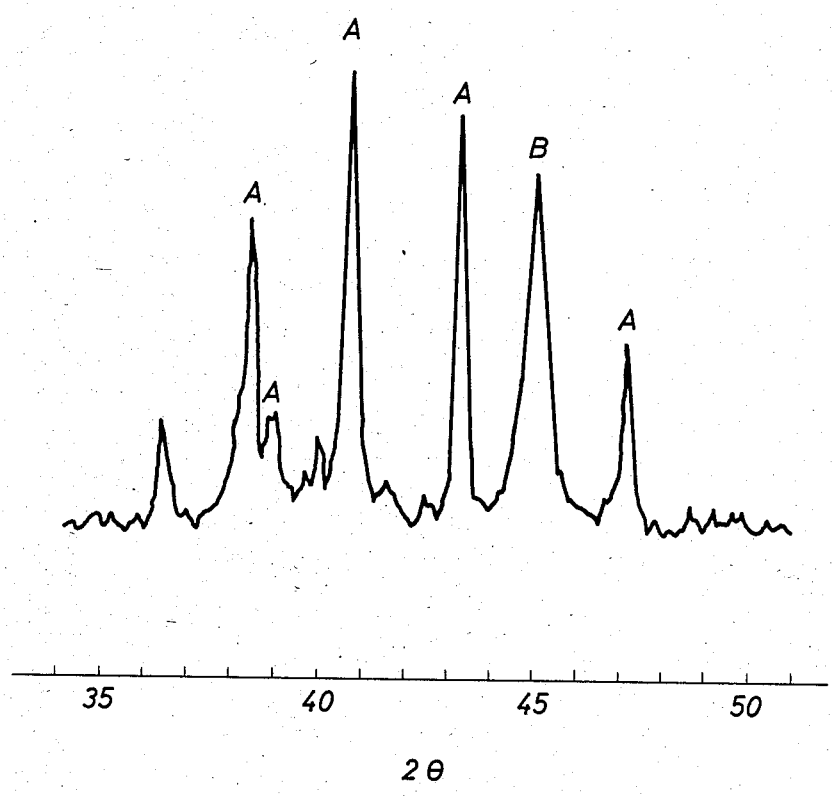

FIG. 2 is the X-ray diffraction pattern of the thus obtained blackish brown particles, the peaks (A) being those of barium ferrite and the peaks (B) being those of magnetite. Namely, the particle shows a double-phase structure.

EXAMPLE 6

In the same manner as in Example 5 except for adjusting the pH of the aqueous mixture to 14 and heating the aqueous mixture to 70° C., the blackish brown particles were obtained. The shape and the size of the thus obtained particles were almost the same as those of the particles before the thermal treatment, as a result of electron-microscopic observation.

The thus obtained blackish brown particles showed BET specific surface area of 39 m²/g, a coercive force (Hc) of 320 Oe and a magnetization (M) of 60 emu/g.

As a result of X-ray diffraction analysis of the thus obtained blackish brown particles, there are two kinds of peaks, one being a peak of barium ferrite and the other being a peak of magnetite, and accordingly, it is recognized that the particle shows a double-phase structure.

What is claimed is:

1. Plate-like barium ferrite particles showing a magnetization (M) of more than 40 emu/g in a magnetic field of 10 KOe, a coercive force of 300 to 1000 Oe and an average particle diameter of 0.05 to 0.3 μm, comprising plate-like particles represented by the formula:

$$BaFe_{12-2x}M_xTi_xO_{19}$$

wherein x is 0 to 1.2 and M represents Co(II) or Co(II) and a divalent metal ion other than Co(II) selected from Fe, Mn, and Zn, the surface of the plate-like particles being modified with magnetite represented by the formula:

$$FeO_y \cdot Fe_2O_3$$

wherein y is over 0 and not more than 1, said plate-like barium ferrite particles absent the magnetite exhibiting a magnetization of less than 40 emu/g in a magnetic field of 10 kOe.

2. A process for producing plate-like barium ferrite particles for use in magnetic recording comprising;
mixing plate-like barium ferrite particles exhibiting a magnetization of less than 40 emu/g in a magnetic field of 10 KOe and represented by the formula: $BaFe_{12-2x}M_xTi_xO_{19}$ wherein x is 0 to 1.2 and M represents Co(II) or Co(II) and a divalent, metal ion other than Co (II) selected from Fe, Mn and Zn with an aqueous alkaline suspension of Fe(OH)₂ of a pH of 8.0 to 14 containing at least 0.1 and not more than 50 atomic % of Fe(II) to total Fe(III) of said plate-like particles, and
thermally treating the thus prepared aqueous mixture at a temperature of 50° to 100° C. in a non-oxidative atmosphere, whereby the surface of said plate-like particles of $BaFe_{12-2x}M_xTi_xO_{19}$ wherein x and M are as defined above is modified with a magnetite of $FeO_y \cdot Fe_2O_3$ wherein y is over 0 and not more than 1, said surface modified plate-like barium ferrite particles exhibiting a magnetization of more than 40 emu/g in a magnetic field of 10 KOe, a coercieve force of 300 to 1000 Oe and an average particle diameter of 0.05 to 0.3 μm.

* * * * *